United States Patent
Omura et al.

(10) Patent No.: US 10,221,334 B2
(45) Date of Patent: Mar. 5, 2019

(54) GAS BARRIER FILM

(71) Applicant: TOPPAN PRINTING CO., LTD., Tokyo (JP)

(72) Inventors: Yuki Omura, Tokyo (JP); Junichi Kaminaga, Tokyo (JP); Sayaka Hoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/136,146

(22) Filed: Apr. 22, 2016

(65) Prior Publication Data

US 2016/0237308 A1    Aug. 18, 2016

Related U.S. Application Data

(63) Continuation of application No. PCT/JP2014/078610, filed on Oct. 28, 2014.

(30) Foreign Application Priority Data

Oct. 28, 2013  (JP) .................................. 2013-223680

(51) Int. Cl.
  *C09D 175/04*  (2006.01)
  *C09D 129/04*  (2006.01)
  (Continued)

(52) U.S. Cl.
  CPC ............ *C09D 175/04* (2013.01); *B32B 27/06* (2013.01); *B32B 27/08* (2013.01); *B32B 27/306* (2013.01);
  (Continued)

(58) Field of Classification Search
  CPC ...... C09D 175/04; C09D 129/04; B65D 1/00; C08K 3/34; C08L 29/04; C08G 18/0823;
  (Continued)

(56) References Cited

U.S. PATENT DOCUMENTS

| | | | |
|---|---|---|---|
| 6,569,533 B1 * | 5/2003 | Uchida | ............. C08G 18/0823 428/423.1 |
| 2005/0084686 A1 | 4/2005 | Imaizumi | |

(Continued)

FOREIGN PATENT DOCUMENTS

| | | |
|---|---|---|
| CN | 101272904 A | 9/2008 |
| JP | H06-093133 | 4/1994 |

(Continued)

OTHER PUBLICATIONS

Extended European Search Report dated Apr. 21, 2017, in corresponding European Patent Application No. 14857607.7.

(Continued)

*Primary Examiner* — Thao T Tran
(74) *Attorney, Agent, or Firm* — Foley & Lardner LLP

(57) ABSTRACT

A gas barrier film includes a resin film base material, a layer made of an aqueous coating agent (A) which contains a hardener and has gas barrier properties and adhesiveness to the resin film base material, the layer made of the aqueous coating agent (A) being formed on at least one surface of the resin film base material, and at least one layer made of an aqueous coating agent (B) having a compounding ratio of a hardener smaller than that of the aqueous coating agent (A), the layer made of the aqueous coating agent (B) being formed on the layer made of the aqueous coating agent (A).

10 Claims, 1 Drawing Sheet

(51) Int. Cl.

| | |
|---|---|
| *C08J 7/04* | (2006.01) |
| *B32B 27/30* | (2006.01) |
| *B32B 27/40* | (2006.01) |
| *B32B 27/06* | (2006.01) |
| *B32B 27/08* | (2006.01) |
| *B32B 27/32* | (2006.01) |
| *B32B 27/36* | (2006.01) |
| *B65D 1/00* | (2006.01) |
| *C08G 18/08* | (2006.01) |
| *C08K 3/34* | (2006.01) |

(52) U.S. Cl.
CPC .............. *B32B 27/32* (2013.01); *B32B 27/36* (2013.01); *B32B 27/40* (2013.01); *B65D 1/00* (2013.01); *C08G 18/0823* (2013.01); *C08J 7/042* (2013.01); *C09D 129/04* (2013.01); *B32B 2255/10* (2013.01); *B32B 2255/20* (2013.01); *B32B 2255/26* (2013.01); *B32B 2255/28* (2013.01); *B32B 2307/31* (2013.01); *B32B 2307/412* (2013.01); *B32B 2307/518* (2013.01); *B32B 2307/7242* (2013.01); *B32B 2439/70* (2013.01); *C08J 2323/12* (2013.01); *C08J 2367/02* (2013.01); *C08J 2400/14* (2013.01); *C08J 2401/28* (2013.01); *C08J 2429/04* (2013.01); *C08J 2475/04* (2013.01); *C08K 3/34* (2013.01)

(58) Field of Classification Search
CPC ................ C08J 2323/12; C08J 2367/02; C08J 2400/14; C08J 2401/28; C08J 2429/04; C08J 2475/04; C08J 7/042; B32B 2250/10; B32B 2250/20; B32B 2250/26; B32B 2250/28; B32B 2307/31; B32B 2307/412; B32B 2307/518; B32B 2307/7242; B32B 2439/70; B32B 27/06; B32B 27/08; B32B 27/306; B32B 27/32; B32B 27/36; B32B 27/40
USPC ............................................ 428/423.1, 423.3
See application file for complete search history.

(56) References Cited

U.S. PATENT DOCUMENTS

| | | | |
|---|---|---|---|
| 2009/0022981 A1* | 1/2009 | Yoshida | C08J 7/045 428/336 |
| 2009/0053542 A1* | 2/2009 | Kuwata | B32B 7/12 428/480 |
| 2009/0280333 A1 | 11/2009 | Kuwata et al. | |
| 2012/0238446 A1* | 9/2012 | Tsuchimura | B41M 5/305 503/207 |
| 2012/0270058 A1* | 10/2012 | Tsumagari | C08J 7/045 428/447 |
| 2014/0363661 A1 | 12/2014 | Kaminaga et al. | |
| 2014/0370270 A1 | 12/2014 | Kaminaga et al. | |
| 2017/0036832 A1* | 2/2017 | Omura | B32B 9/00 |

FOREIGN PATENT DOCUMENTS

| | | |
|---|---|---|
| JP | H09-150484 A | 6/1997 |
| JP | H09-151265 A | 6/1997 |
| JP | H11-165369 A | 6/1999 |
| JP | 2001-287294 A | 10/2001 |
| JP | 2002-316381 A | 10/2002 |
| JP | 3351208 B2 | 11/2002 |
| JP | 2003-71971 A | 3/2003 |
| JP | 2003-211578 A | 7/2003 |
| JP | 2005-225117 A | 8/2005 |
| JP | 3764109 B2 | 4/2006 |
| JP | 4380318 B2 | 12/2009 |
| JP | 2013-208901 A | 10/2013 |
| WO | WO 2012/131362 A2 | 10/2012 |
| WO | WO 2013/129515 A1 | 9/2013 |
| WO | WO 2013/129520 A1 | 9/2013 |

OTHER PUBLICATIONS

Office Action dated Mar. 14, 2017 in corresponding Chinese Patent Application No. 201480058549.4.
International Search Report issued in PCT/JP2014/078610 dated Feb. 3, 2015.
Chinese office action dated Nov. 14, 2017 in corresponding application No. 2014800585494.

* cited by examiner

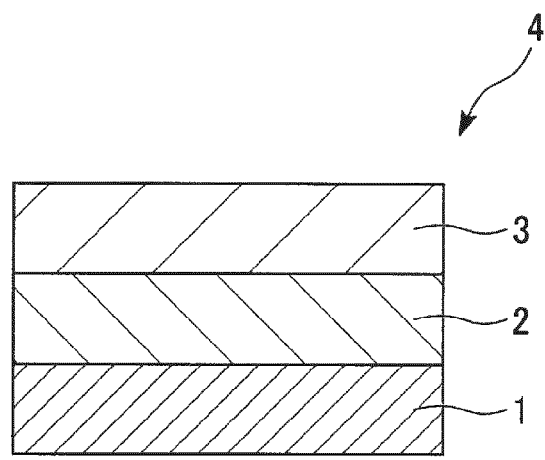

GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2014/078610 filed on Oct. 28, 2014, which is based upon and claims the benefit of priority of Japanese Application No. 2013-223680, filed on Oct. 28, 2013, the entire contents of them all are hereby incorporated by reference

TECHNICAL FIELD

The present invention relates to gas barrier films used for packaging materials for food products such as dried food, sweets, bread and delicacies which are sensitive to moisture and oxygen and for pharmaceutical products such as disposable body warmers, tablets, powders, compresses and adhesive skin patches. More specifically, the present invention relates to gas barrier films used in the field of packages which require high gas barrier properties and transparency that allows for recognition of the product inside.

BACKGROUND

Packaging materials used for packaging food products or pharmaceutical products require properties (gas barrier properties) to protect the product inside from moisture, oxygen and other gases that degrade the product in order to prevent the product from being degraded or decaying and retain the functions and nature of the product.

Accordingly, conventional packaging materials have been provided with a gas barrier layer made of a material having gas barrier properties. The gas barrier layer has been formed on the base material such as a film or paper by sputtering, vapor deposition, wet coating or printing. Further, the gas barrier layer has been formed of a metal foil or a metal deposition film made of a metal such as aluminum, or a resin film made of a material such as polyvinyl alcohol, ethylene-vinyl alcohol copolymer or polyvinylidene chloride (e.g., see PTLs 1 to 5).

Although the metal foil and metal deposition film have good gas barrier properties, they have various problems, for example, that product recognition is not possible due to the opaqueness of the metal foil or metal deposition film, cracks occur with several percent of elongation due to the low elasticity, thus leading to lowering of the gas barrier properties, and the package has to be treated as an incombustible material when discarded after use.

Further, gas barrier layers made of a resin film of polyvinylidene chloride have high gas barrier properties without humidity dependence. However, they are unpopular as packaging material since they contain chlorine and may become a source of generating harmful substances such as dioxin during disposal treatment.

On the other hand, gas barrier layers made of a resin film of non-chlorine polyvinyl alcohol or ethylene-vinyl alcohol copolymer have high gas barrier properties in a low-humidity atmosphere. However, since they are humidity-dependent, they have disadvantages that the gas barrier properties significantly decreases with increase in humidity.

Other types of gas barrier resin films are inferior in the gas barrier properties to polyvinylidene chloride resin films and polyvinyl alcohol resin films that are placed in a low-humidity atmosphere.

In order to improve the gas barrier properties of these resin films, there has been proposed a resin film that is made of a composite of a resin and an inorganic layered mineral (e.g., see PTLs 6 and 7). In such a resin film, the inorganic layered mineral should be orderly distributed and arranged so as to improve gas barrier properties. However, the regular distribution and arrangement of the inorganic layered mineral will lead to a lowering in cohesive force of the resin film or adhesion of the resin film to a base material. Therefore, it is quite difficult to balance good gas barrier properties with sufficient adhesion strength as a packaging material.

In view of the above, a gas barrier film has been proposed in which polyurethane having water solubility or water dispersibility is added to a composite made of polyvinyl alcohol or ethylene-vinyl alcohol copolymer and a layered compound so as to improve adhesiveness between the composite and the base material (e.g., see PTL 6).

However, although the gas barrier film has good gas barrier properties and adhesiveness to the base material in a high-humidity atmosphere, the gas barrier film is inferior in the laminate strength when laminated to another film for use as a packaging material since the cohesive strength of the film is low.

Further, a gas barrier film has been proposed in which a composite made of polyvinyl alcohol or ethylene-vinyl alcohol copolymer and a layered compound is applied in thin layer and dried in a repeated manner so as to improve orientation of the layered compound (e.g., see PTL 7).

However, the gas barrier film has difficulties in balancing high gas barrier properties in a high-humidity atmosphere with sufficient adhesion strength and cohesive strength of the film.

CITATION LIST

Patent Literature

| PTL 1 | JP-A-2001-287294 |
| PTL 2 | JP-A-H11-165369 |
| PTL 3 | JP-A-H06-093133 |
| PTL 4 | JP-A-H09-150484 |
| PTL 5 | JP-B-3764109 |
| PTL 6 | JP-B-3351208 |
| PTL 7 | JP-B-4380318 |

SUMMARY OF THE INVENTION

Technical Problem

The present invention has been made in view of the above circumstances, and has an object to provide a gas barrier film having improved or even high gas barrier properties in a high-humidity atmosphere and having sufficient adhesion strength and film cohesive strength as a packaging material for an extended period of time to minimize decrease in laminate strength.

Solution to Problem

A gas barrier film according to an embodiment of the present invention includes a resin film base material, a layer made of an aqueous coating agent (A) which contains a hardener and has gas barrier properties and adhesiveness to the resin film base material, the layer made of the aqueous coating agent (A) being formed on at least one surface of the resin film base material, and at least one layer made of an aqueous coating agent (B) having a compounding ratio of a hardener smaller than that of the aqueous coating agent (A), the layer made of the aqueous coating agent (B) being formed on the layer made of the aqueous coating agent (A).

The aqueous coating agent (B) may not contain a hardener.

The aqueous coating agent (A) may contain an aqueous polyurethane resin (C) having water solubility or water dispersibility, a water soluble polymer (D) and an inorganic layered mineral (E).

The aqueous coating agent (A) may contain the aqueous polyurethane resin (C) having water solubility or water dispersibility, the water soluble polymer (D) and the inorganic layered mineral (E), and the aqueous coating agent (B) may contain the water soluble polymer (D) and the inorganic layered mineral (E).

The aqueous coating agent (A) and the aqueous coating agent (B) may contain the aqueous polyurethane resin (C) having water solubility or water dispersibility, the water soluble polymer (D) and the inorganic layered mineral (E).

The aqueous polyurethane resin (C) may be an aqueous polyurethane resin which contains a polyurethane resin having an acid group and a polyamine compound.

The water soluble polymer (D) may be a polyvinyl alcohol resin.

The inorganic layered mineral (E) may be a water-swellable synthetic mica.

Advantageous Effects of Invention

According to an aspect of the gas barrier film of the present invention, a layer having gas barrier properties and adhesiveness to the resin film base material is formed on at least one surface of the resin film base material, and at least one layer having an affinity for the layer and gas barrier properties is disposed on the layer. Accordingly, the gas barrier film has high gas barrier properties in a high-humidity atmosphere and has good adhesiveness to the resin film base material and film cohesiveness for an extended period of time. Therefore, use of the gas barrier film according to an aspect of the present invention as a packaging material can enhance the preservation of product quality.

BRIEF DESCRIPTION OF THE DRAWINGS

FIG. 1 is a cross sectional view of an example of a gas barrier film according to an embodiment of the present invention.

DESCRIPTION OF THE REPRESENTATIVE EMBODIMENTS

An embodiment of a gas barrier film of the present invention will be described. The present embodiment is described in detail for better understanding of the principle of the invention, and should not be construed to limit the present invention unless otherwise specifically provided. Instead the embodiment described below is representative of the disclosed invention.

[Gas Barrier Film 4]

A gas barrier film 4 according to an embodiment of the present invention includes a resin film base material 1, a layer 2 made of an aqueous coating agent (A) which contains a hardener and has gas barrier properties and adhesiveness to the resin film base material 1, the layer 2 being formed on at least one surface of the resin film base material 1, and at least one layer 3 made of an aqueous coating agent (B) having a compounding ratio of a hardener smaller than that of the aqueous coating agent (A), the layer 3 being formed on the layer 2 made of the aqueous coating agent (A).

[Resin Film Base Material 1]

Materials for the resin film base material 1 include, for example, films made of olefin resins including poly C2-10 such as polyethylene, polypropylene and propylene-ethylene copolymer; polyester resins including polyethylene terephthalate and polybutylene terephthalate; polyamide resins such as aliphatic polyamides such as nylon 6 and nylon 66, and aromatic polyamides such as polymetaxylylene adipamide; vinyl resins including polystyrene, polyvinyl acetate, ethylene-vinyl acetate copolymer, polyvinyl alcohol and ethylene-vinylalcohol copolymer; acryl resins including homopolymers or copolymers of meth(acryl) monomers such as polymethyl methacrylate and polyacrylonitrile; and cellophanes. These resins may be used singly or in combination of two or more.

The resin film base material 1 used includes a single-layer film formed of a single resin and a single-layer or laminated film formed of a plurality of resins. Alternatively, those resins may be stacked on a different base material (metal, wood, paper, ceramics or the like) for use as a stacked layer base material.

Advantageously, a polyolefin resin film (particularly, polypropylene film), a polyester resin film (particularly, polyethylene terephthalate resin film), a polyamide resin film (particularly, nylon film) or the like is used as a resin film base material 1.

The resin film base material 1 may be processed with corona treatment, low temperature plasma treatment or the like on the surface to be coated (the surface on which the layer is formed) to improve a wettability to a coating agent and adhesion strength to the layer.

The thickness of the resin film base material 1 is not specifically limited, but may be appropriately selected depending on the cost or applications while taking account of the suitability as a packaging material or the lamination suitability to other layers. Practically, the thickness is in the range from 3 µm to 200 µm, preferably in the range from 5 µm to 120 µm, and more preferably in the range from 10 µm to 100 µm.

[Aqueous Coating Agent (A)]

The aqueous coating agent (A) is preferably a material that balances oxygen barrier properties in a high-humidity atmosphere with adhesiveness to the resin film base material 1. In order to meet those requirements, it is preferable that the aqueous coating agent (A) contains, for example, an aqueous polyurethane resin (C) having water solubility or water dispersibility, a water soluble polymer (D) and an inorganic layered mineral (E) as main components along with a hardener.

[Aqueous Polyurethane Resin (C)]

Due to containing the aqueous polyurethane resin (C) having water solubility or water dispersibility, the aqueous coating agent (A) can exhibit wettability and adhesiveness to the resin film base material 1. Particularly, in order to impart oxygen barrier properties in a high-humidity atmosphere, the aqueous polyurethane resin (C) is preferably an aqueous polyurethane resin which contains a polyurethane resin having an acid group and a polyamine compound.

As an example of the aqueous polyurethane resin (C), an aqueous polyurethane resin which contains a polyurethane resin having an acid group and a polyamine compound will be described in detail. However, unless otherwise specifically described, the aqueous polyurethane resin (C) of the present embodiment is not limited to the aqueous polyurethane resin which contains a polyurethane resin having an acid group and a polyamine compound.

The acid group of the polyurethane resin (anionic self-emulsified polyurethane resin) which constitutes the aqueous polyurethane resin includes a carboxyl group, a sulfonic acid group and the like.

Although the acid group may be located at a terminal or a side chain of the polyurethane resin, the acid group should be located at least on a side chain of the polyurethane resin. This acid group can be usually neutralized with a neutralizer (base) and may form a salt along with a base. Further, the acid group may be bonded with an amino group (an imino group or a tertiary nitrogen atom) of the polyamine compound that constitutes the aqueous polyurethane resin.

The acid value of the aqueous polyurethane resin can be selected within a range capable of imparting water solubility or water dispersibility and is generally in the range from 5 to 100 mg KOH/g, preferably in the range from 10 to 70 mg KOH/g, and more preferably in the range from 15 to 60 mg KOH/g.

When the acid value of the aqueous polyurethane resin is low, the water solubility and water dispersibility of the aqueous polyurethane resin is insufficient, leading to decrease in uniform dispersibility of the aqueous polyurethane resin and other materials and decrease in dispersion stability of a coating agent. When the acid value of the aqueous polyurethane resin is too high, the water resistance and the gas barrier properties of the gas barrier layer decrease. The acid value within the above range can prevent decrease in dispersion stability and decrease in water resistance and gas barrier properties.

Further, the total concentration of a urethane group and a urea group of the aqueous polyurethane resin is preferably 15 mass % or more, more preferably 20 to 60 mass % in view of gas barrier properties.

When the total concentration of a urethane group and a urea group of is low, the gas barrier properties of the gas barrier layer decreases. When the total concentration of a urethane group and a urea group of is too high, the gas barrier layer is rigid and brittle. Accordingly, it is preferable that the total concentration of a urethane group and a urea group of the aqueous polyurethane resin is in the range from 20 to 60 mass %.

The urethane group concentration and urea group concentration refer to, respectively, a value of the molecular weight of the urethane group (59 g/equivalent) and a value of the molecular weight of the urea group (primary amino group (amino group): 58 g/equivalent, secondary amino group (imino group): 57 g/equivalent) divided by the molecular weight of the recurring units of the polyurethane resin.

Further, when a mixture is used as an aqueous polyurethane resin, the concentration of urethane group and the concentration of urea group can be, respectively, calculated based on the charging ratio of the respective reaction components, that is, the ratio of the respective components used.

The aqueous polyurethane resin generally contains at least rigid units (units constituted of a hydrocarbon ring) and short-chain units (e.g., units constituted of a hydrocarbon chain). That is, the recurring units of the aqueous polyurethane resin generally contain a hydrocarbon ring (at least one of aromatic and non-aromatic hydrocarbon rings) derived from a polyisocyanate component, a polyhydroxy acid component, a polyol component or an elongated chain component (especially, at least a polyisocyanate component).

The ratio of the hydrocarbon ring units to the recurring units of the aqueous polyurethane resin is generally 10 to 70 mass %, preferably 15 to 65 mass %, and more preferably 20 to 60 mass %.

When the ratio of the hydrocarbon ring units to the recurring units of the aqueous polyurethane resin is low, the gas barrier properties of the gas barrier layer decrease. When the ratio of the hydrocarbon ring units to the recurring units of the aqueous polyurethane resin is too high, the gas barrier layer is rigid and brittle. Accordingly, the values described above are preferable.

The number-average molecular weight of the aqueous polyurethane resin may be appropriately selected and is preferably in the range from 800 to 1,000,000, more preferably in the range from 800 to 200,000 and further more preferably in the range from 800 to 100,000.

When the number-average molecular weight of the aqueous polyurethane resin is too high, the viscosity of the coating agent increases, which is not desirable. When the number-average molecular weight of the aqueous polyurethane resin is too low, the barrier properties of the gas barrier layer may decrease. Accordingly, the values above described are preferable.

The aqueous polyurethane resin may be crystalline for the purpose of improving the gas barrier properties.

The glass transition point of the aqueous polyurethane resin is preferably 100° C. or more (e.g., in the order of 100 to 200° C.), more preferably 110° C. or more (e.g., in the order of 110 to 180° C.), and further more preferably 120° C. or more (e.g., in the order of 120 to 150° C.).

When the glass transition point of the aqueous polyurethane resin is less than 100° C., the gas barrier properties of the gas barrier layer decrease, which is not desirable. Further, in the aqueous polyurethane resin that falls within the value ranges described above, a glass transition point of 150° C. or more is not substantially possible.

The aqueous polyurethane resin generally contains a neutralizer and is formed with the above polyurethane resin dissolved or dispersed in an aqueous medium.

The aqueous medium includes water, an aqueous solvent, a hydrophilic solvent and a mixed solvent thereof. The aqueous medium is generally water or an aqueous medium containing water as a main component.

Examples of the hydrophilic solvent include alcohols such as ethanol, isopropanol and the like, ketones such as acetone, methyl ethyl ketone and the like; ethers such as tetrahydrofuran; cellosolves; carbitols; and nitriles such as acetonitrile.

The aqueous polyurethane resin may be either an aqueous solution of the polyurethane resin dissolved in an aqueous medium or an aqueous dispersion of the polyurethane resin dispersed in an aqueous medium.

In the aqueous dispersion, the average particle size of dispersed particles (polyurethane resin particles) is not specifically limited and is, for example, in the range from 20 nm to 500 nm, preferably in the range from 25 nm to 300 nm, and more preferably in the range from 30 nm to 200 nm.

When the average particle size of dispersed particles is too large, the uniform dispersibility of dispersed particles and other materials and the dispersion stability of coating agent decrease, leading to decrease in the gas barrier properties of the gas barrier layer. Further, it is practically difficult to obtain a dispersion having an average particle size of less than 20 nm of the dispersed particles. When the average particle size of the dispersed particles is less than 20 nm, the dispersion stability of the coating agent and the gas barrier properties of the gas barrier layer are not expected to be improved.

Methods for manufacturing the aqueous polyurethane resin are not specifically limited, and may be ordinary aqueous conversion techniques of polyurethane resin such as an acetone method, a prepolymer method and the like. Further, in urethanation reactions, urethanation catalysts such as an amine catalyst, a tin catalyst and a lead catalyst may be used as necessary.

For example, the aqueous polyurethane resin can be manufactured by reacting a polyisocyanate compound, a polyhydroxy acid and, if necessary, at least one of a polyol component and a chain extension component in an inert organic solvent including ketones such as acetone, ethers such as tetrahydrofuran and nitriles such as acetonitrile. More specifically, a polyisocyanate compound, a polyhydroxy acid and a polyol component are reacted in an inert organic solvent (particularly, a hydrophilic or water-soluble organic solvent) to generate a prepolymer having an isocyanate group at terminals thereof. Then, the prepolymer having an isocyanate group at terminals thereof is neutralized by using a neutralizer for dissolution or dispersion in an aqueous medium. After that, a chain extension component is added for reaction of the neutralized prepolymer, and the organic solvent is removed to prepare the aqueous polyurethane resin.

In the aqueous polyurethane resin, the polyamine compound as a crosslinking agent is bonded to the acid group of the polyurethane resin, thereby developing gas barrier properties.

The bond between the polyamine compound and the acid group of the polyurethane resin may be an ionic bond (e.g., ionic bond between a tertiary amino group and a carboxyl group) or a covalent bond (e.g., amide bond).

Accordingly, the polyamine compound preferably includes various polyamines which contain two types or more of basic nitrogen atoms selected from a group consisting of primary amino group, secondary amino group and tertiary amino group.

The polyamine compound constituting the aqueous polyurethane resin is not specifically limited and may be various compounds as far as it is capable of bonding to an acid group and improving gas barrier properties.

The polyamine compound may be a polyamine having an amine value which is generally in the range from 100 to 1900 mg KOH/g, preferably in the range from 150 to 1900 mg KOH/g (e.g., 200 to 1700 mg KOH/g), and more preferably in the range from 200 to 1900 mg KOH/g (e.g., 300 to 1500 mg KOH/g). The amine value of the polyamine compound may be in the order of 300 to 1900 mg KOH/g.

[Water Soluble Polymer (D)]

The water soluble polymer (D) refers to a polymer that can be completely dissolved in water at a normal temperature or finely dispersed in water at a normal temperature.

The water soluble polymer (D) is not specifically limited as far as it can be inserted or coordinated (intercalated) between the unit crystal layers of the inorganic layered mineral (E), which will be described later.

The water soluble polymer (D) may be, for example, polyvinyl alcohol and its derivatives, cellulose derivatives such as carboxymethylcellulose and hydroxyethylcellulose; starches such as oxidized starch, etherified starch and dextrin; polyvinylpyrrolidone, polyacrylic acid, polymethacrylic acid or ethers and salts of polymethacrylic acid, and copolymers thereof; copolymerized polyesters containing a polar group such as of sulfoisophthalic acid; vinyl polymers such as polyhydroxyethylmethacrylate and copolymers thereof; urethane polymers; or functional group modified polymers with a modified carboxyl group or the like of various types of polymers described above.

Of the water soluble resins (D), at least one type used is preferably a polyvinyl alcohol polymer and a derivative thereof. A polyvinyl alcohol resin having a degree of saponification of 95% or more and a degree of polymerization of 300 is more preferred.

The polyvinyl alcohol resin has lower hygroscopic and swellable properties with increase in the degree of saponification and polymerization.

When the degree of saponification of polyvinyl alcohol resin is less than 95%, sufficient gas barrier properties are not achieved. When the degree of polymerization of polyvinyl alcohol resin is less than 300, the gas barrier properties and the film cohesive strength are lowered.

[Inorganic Layered Mineral (E)]

The inorganic layered mineral (E) refers to an inorganic compound in which extremely thin unit crystal layers are superposed to form a single layered particle.

The inorganic layered mineral (E) is preferably a compound which swells and cleaves in water. Particularly, clay compounds having water-swellable properties are preferably used. More preferably, the inorganic layered mineral (E) is a clay compound in which water is coordinated between extremely thin unit crystal layers to impart absorptive and swellable properties. In general, the clay compound is a compound having a layered structure made up of layers having a tetrahedral structure in which $Si^{4+}$ is coordinated with $O^{2-}$, and layers having an octahedral structure in which $Al^{3+}$, $Mg^{2+}$, $Fe^{2+}$, $Fe^{3+}$ or the like is coordinated with $O^{2-}$ and $OH^-$, which are bonded at 1:1 or 2:1 and built up. The clay compound may be a natural compound or a synthetic compound.

Typical examples of inorganic layered mineral (E) include hydrous silicates such as phyllosilicate minerals, and include, for example, kaolinite clay minerals such as halloysite, kaolinite, endellite, dickite and nacrite; antigorite clay minerals such as antigorite and chrysotile; smectite clay minerals such as montmorillonite, beidellite, nontronite, saponite, hectorite, sauconite and stevensite; vermiculite clay minerals such as vermiculite; micas such as white mica and bronze mica; and micas or mica clay minerals such as margarite, tetra-silicic mica and taeniolite.

Those inorganic layered minerals (E) may be used singly or in a combination of two or more.

Of those inorganic layered mineral (E), smectite clay minerals such as montmorillonite or mica clay minerals such as water-swellable mica are particularly preferred.

The inorganic layered mineral (E) preferably has an average particle size not more than 10 μm and a thickness not more than 500 nm. When the average particle size and the thickness are within the above range, the inorganic layered mineral can be easily uniformly arranged in the gas barrier layer, leading to increase in gas barrier properties and film cohesive strength. More preferably, at least one those inorganic layered minerals (E) is a water-swellable synthetic mica having the average particle size of 1 to 10 μm and the thickness of 10 to 100 nm.

When used as the inorganic layered mineral (E), the water-swellable synthetic mica has high miscibility with the aqueous polyurethane resin (C) and the water soluble polymer (D). Further, since the water-swellable synthetic mica contains less impurities compared to natural mica, it does not lead to decrease in gas barrier properties or film cohesiveness in the gas barrier layer derived from the impurities. Further, water-swellable synthetic mica, which contains fluorine atoms in the crystal structure, also contributes to minimizing the humidity dependence of the gas barrier properties of the layer 2 made of the aqueous coating agent (A). Moreover, comparing with other types of water-swellable inorganic layered mineral, water-swellable synthetic mica has a high aspect ratio and hence can more effectively exert a labyrinth effect, thereby particularly contributing to developing the gas barrier properties of the layer 2 made of the aqueous coating agent (A).

The solid content compounding ratios of the aqueous polyurethane resin (C), the water soluble polymer (D) and the inorganic layered mineral (E) to the total solid content of the aqueous coating agent (A) are preferably in the following ranges:

| | |
|---|---|
| Aqueous polyurethane resin (C) | 5 to 80 mass % |
| Water soluble polymer (D) | 10 to 80 mass % |
| Inorganic layered mineral (E) | 8 to 25 mass % |

When the solid content compounding ratio of the aqueous polyurethane resin (C) to the total solid content is less than 5 mass %, the wettability and adhesiveness of the layer 2 made of the aqueous coating agent (A) to the resin film base material 1 is insufficient. On the other hand, when the solid content compounding ratio of the aqueous polyurethane resin (C) to the total solid content is more than 80 mass %, the film cohesive strength of the layer 2 made of the aqueous coating agent (A) is lowered.

When the solid content compounding ratio of the water soluble polymer (D) to the total solid content is less than 10 mass %, the film cohesive strength of the layer 2 made of the aqueous coating agent (A) is lowered. On the other hand, when the solid content compounding ratio of the water soluble polymer (D) to the total solid content is more than 80 mass %, the wettability and adhesiveness of the layer 2 made of the aqueous coating agent (A) to the resin film base material 1 is insufficient.

When the solid content compounding ratio of the inorganic layered mineral (E) to the total solid content is less than 8 mass %, sufficient gas barrier properties of the layer 2 made of the aqueous coating agent (A) are not achieved. On the other hand, when the solid content compounding ratio of the inorganic layered mineral (E) to the total solid content is more than 25 mass %, the cohesive strength of the layer 2 made of the aqueous coating agent (A) is lowered.

The solid content compounding ratios of the aqueous polyurethane resin (C), the water soluble polymer (D) and the inorganic layered mineral (E) to the total solid content of the aqueous coating agent (A) are more preferably in the following ranges:

| | |
|---|---|
| Aqueous polyurethane resin (C) | 5 to 60 mass % |
| Water soluble polymer (D) | 25 to 75 mass % |
| Inorganic layered mineral (E) | 8 to 25 mass % |

When the solid content compounding ratios of the aqueous polyurethane resin (C), the water soluble polymer (D) and the inorganic layered mineral (E) to the total solid content of the aqueous coating agent (A) are in the above ranges, the resultant gas barrier film 4 has high gas barrier properties in a high-humidity atmosphere and exhibits sufficient adhesive strength and film cohesive strength as a packaging material for an extended period of time.

[Hardener]

The hardener is not specifically limited as far as it is a compound that is reactive to a water soluble polymer and at least one of water soluble or water dispersible urethane resins. Particularly, a water dispersible (water soluble) carbodiimide, a water soluble epoxy compound, a water dispersible (water soluble) oxazolidone compound, a water soluble aziridine compound, a water dispersible isocyanate hardener and the like are preferably used. Particularly, a water dispersible isocyanate hardener, which has a good reaction to hydroxyl groups of a water soluble urethane resin, is preferably used.

The solid content compounding ratio of the hardener to the total solid content of the aqueous coating agent (A) is preferably in the range from 5 to 15 mass %.

When the solid content compounding ratio of the hardener to the total solid content of the aqueous coating agent (A) is less than 5 mass %, the adhesiveness of the layer 2 made of the aqueous coating agent (A) to the resin film base material 1 is lowered. On the other hand, when the solid content compounding ratio of the hardener to the total solid content of the aqueous coating agent (A) is more than 15 mass %, the gas barrier properties of the layer 2 made of the aqueous coating agent (A) are lowered.

Examples of polyisocyanate compound used for the water dispersible isocyanate hardener include aromatic polyisocyanate compounds, alicyclic polyisocyanate compounds and aliphatic polyisocyanate compounds. In order to suppress a reaction in the aqueous coating agent (A) and extend a usable period of time, alicyclic polyisocyanate compounds and aliphatic polyisocyanate compounds are preferably used.

Examples of isocyanate compounds constituting alicyclic polyisocyanate compounds include bis(isocyanate) methylcyclohexane (hydrogenated XDI), and methylenebis(4,1-cyclohexylene)=diisocyanate (hydrogenated MDI).

Examples of isocyanate compound constituting aliphatic polyisocyanate compound include trimethylene diisocyanate, 1,2-propylene diisocyanate, butylene diisocyanate (tetramethylene diisocyanate, hexamethylene diisocyanate and pentamethylene diisocyanate.

The aromatic polyisocyanate compound, the alicyclic polyisocyanate compound, and the aliphatic polyisocyanate compound can be used in a mixture.

[Aqueous Coating Agent (B)]

The aqueous coating agent (B) may have different composition from the aqueous coating agent (A) as far as it can constitute a layer having good oxygen barrier properties in a high-humidity condition. For showing good oxygen barrier properties, the compounding ratio of the hardener to the aqueous coating agent (B) should be lower than the compounding ratio of the hardener to the aqueous coating agent (A).

The aqueous coating agent (B) may not necessarily contain a hardener. An aqueous coating agent (B) not containing a hardener can show improved oxygen barrier properties, since it does not have deterioration of oxygen barrier properties caused by the hardener.

The aqueous coating agent (B) preferably has a composition having an affinity to the aqueous coating agent (A) so as to achieve good wettability and adhesive strength to the layer 2 made of the aqueous coating agent (A). For example, the aqueous coating agent (B) may contain the aqueous polyurethane resin (C), the water soluble polymer (D) and the inorganic layered mineral (E) as main components, and the solid content compounding ratios of the aqueous polyurethane resin (C), the water soluble polymer (D) and the inorganic layered mineral (E) to the total solid content of the aqueous coating agent (B) may be as follows:

| | |
|---|---|
| Aqueous polyurethane resin (C) | 0 to 60 mass % |
| Water soluble polymer (D) | 5 to 90 mass % |
| Inorganic layered mineral (E) | 8 to 25 mass % |

When the solid content compounding ratios of the aqueous polyurethane resin (C), the water soluble polymer (D) and the inorganic layered mineral (E) to the total solid content of the aqueous coating agent (B) are in the above ranges, it is possible to achieve high gas barrier properties in a high-humidity atmosphere and sufficient adhesive strength and film cohesive strength as a packaging material for an extended period of time.

For the aqueous coating agent (B) which contains the aqueous polyurethane resin (C), the water soluble polymer (D) and the inorganic layered mineral (E) as main components, the solid content compounding ratios of the aqueous polyurethane resin (C), the water soluble polymer (D) and the inorganic layered mineral (E) to the total solid content of the aqueous coating agent (B) may be as follows:

| | |
|---|---|
| Aqueous polyurethane resin (C) | 5 to 60 mass % |
| Water soluble polymer (D) | 15 to 87 mass % |
| Inorganic layered mineral (E) | 8 to 25 mass % |

When the solid content compounding ratios of the aqueous polyurethane resin (C), the water soluble polymer (D) and the inorganic layered mineral (E) to the total solid content of the aqueous coating agent (B) are in the above ranges, it is possible to achieve good wettability to the layer 2 made of the aqueous coating agent (A) for forming a uniform layer, thereby achieving particularly good gas barrier properties.

In addition, the aqueous coating agent (A) and the aqueous coating agent (B) may contain a variety of additives to the extent that gas barrier properties and strength as a packaging laminate film are not compromised.

Examples of additives include antioxidant, weather-resistant agent, thermostabilizer, lubricant, nucleating agent, UV absorber, plasticizer, antistatic agent, coloring agent, filler, surfactant and silane coupling agent.

The aqueous coating agent (A) and the aqueous coating agent (B) may contain water as a main solvent and may further contain other solvent which is soluble or uniformly dispersible in water.

Examples of the solvent include, alcohols such as methanol, ethanol, isopropanol and the like, ketones such as acetone, methyl ethyl ketone and the like; ethers such as tetrahydrofuran; cellosolves; carbitols; and nitriles such as acetonitrile.

The layer 2 made of the aqueous coating agent (A) or the layer 3 made of the aqueous coating agent (B) are manufactured by a known wet coating method.

Examples of the wet coating method include roll coating, gravure coating, reverse coating, die coating, screen printing, spray coating and the like.

The aqueous coating agent (A) or the aqueous coating agent (B) is applied on one or both surfaces of the resin film base material 1 by using the above wet coating methods so as to form a layer made of the aqueous coating agent (A) or the aqueous coating agent (B). Then, the layer made of the aqueous coating agent (A) or the aqueous coating agent (B) is dried. Accordingly, the layer 2 made of the aqueous coating agent (A) or the layer 3 made of the aqueous coating agent (B) is formed.

The layer made of the aqueous coating agent (A) or the aqueous coating agent (B) is dried by a known drying method such as hot-air drying, heat roll drying or infrared radiation.

The layer 2 made of the aqueous coating agent (A) or the layer 3 made of the aqueous coating agent (B) can be formed by a coating method using a tandem coater or a gravure printing machine so that two or more layers can be continuously formed. Considering the processing cost, continuous forming of the layers is preferred. Use of the gravure printing machine is more preferable in that printing for the packaging material can be simultaneously performed.

The dry thickness of the layer 2 made of the aqueous coating agent (A) or the layer 3 made of the aqueous coating agent (B) formed on the resin film base material 1, that is, the thickness of the layer made of the aqueous coating agent (A) or the aqueous coating agent (B) varies depending on the required gas barrier properties, and is preferably in the range from 0.2 μm to 2 μm, more preferably in the range from 0.3 μm to 1 μm.

When the thickness of the layer 2 made of the aqueous coating agent (A) or the layer 3 made of the aqueous coating agent (B) is less than 0.2 μm, sufficient gas barrier properties are not achieved. On the other hand, when the thickness of the layer 2 made of the aqueous coating agent (A) or the layer 3 made of the aqueous coating agent (B) is more than 2 μm, there is a difficulty in forming a uniform layer surface, leading to increase in drying load and manufacturing cost, which is not desirable. When the dry thickness of the layer is in the range from 0.3 μm to 1 μm, drying load does not increase and sufficient barrier properties can be achieved.

The gas barrier film 4 of the present embodiment may be provided with a printing layer, anchor coat layer, over coat layer, light-shielding layer, adhesive layer, heat seal layer and the like as necessary.

Further, by laminating thermally fusible layers, the gas barrier film 4 of the present embodiment can form a packaging laminate film having gas barrier properties which is sealable by heat sealing.

In the gas barrier film 4 of the present embodiment, thermally fusible layers can be laminated by a known dry laminating method, an extrusion laminating method or the like by using a known adhesive such as polyurethane adhesive, polyester adhesive or polyether adhesive.

The gas barrier film 4 of the present embodiment includes the layer 2 made of the aqueous coating agent (A) formed at least on one surface of the resin film base material 1 wherein the aqueous coating agent (A) contains a hardener and has gas barrier properties and adhesiveness to the resin film base material 1. Further, the gas barrier film 4 of the present embodiment includes at least one layer 3 made of the aqueous coating agent (B) formed on the layer 2 made of the aqueous coating agent (A), wherein the aqueous coating agent (B) has good affinity to the layer 2 as well as gas barrier properties and has the compounding ratio of the hardener smaller than that of the aqueous coating agent (A). Accordingly, the gas barrier film 4 of the present embodiment has good gas barrier properties in a high-humidity atmosphere and high adhesiveness to the resin film base material 1 and film cohesiveness for an extended period of time. Therefore, use of the gas barrier film 4 of the present embodiment as a packaging material can enhance the preservation of product quality. Further, the gas barrier film of the present embodiment can be manufactured with reduced cost by performing continuous application of the aqueous coating agent by using a tandem coater or a gravure printing machine.

EXAMPLES

The present invention will be further described in detail by means of the examples and comparative examples. However, the present invention is not limited to those examples.

Examples 1 to 15

As the aqueous polyurethane resin (C) (hereinafter, also referred to as "component (C)"), polyurethane dispersion "Takelac WPB-341," manufactured by Mitsui Chemicals, Inc., which was an aqueous polyurethane resin containing a polyurethane resin having an acid group and a polyamine compound, and Hydran "HW350," manufactured by DIC Inc., which was a polyester polyurethane resin, were used.

As the water soluble polymer (D) (hereinafter, also referred to as "component (D)"), Poval PVA-105 (with a degree of saponification of 98-99% and a degree of polymerization of 500), manufactured by Kuraray Co., Ltd., and carboxymethyl cellulose (CMC) were used.

As the inorganic layered mineral (E) (hereinafter, also referred to as "component (E)"), water-swellable synthetic mica (trade name: Somasif MEB-3, manufactured by Co-op chemical Co., Ltd.) or sodium hectorite (trade name: NHT-sol B2, manufactured by Topy Industries Ltd.) was used.

The component (C), the component (D) and the component (E) were formulated at the solid content compounding ratios shown in Tables 1 and 2, heated to 80° C., mixed, and then cooled to room temperature. Further, a mixture of the component (C), the component (D) and the component (E) was diluted with ion exchanged water and isopropanol so that 10 mass % of the solvent was made of isopropanol and the solid concentrations shown in Tables 1 and 2 were obtained.

As the coating liquid which does not contain a hardener, the above diluted mixture was applied.

As the coating liquid which contains a hardener, the hardener (trade name: Takenate WD-725 (water dispersible polyisocyanate), manufactured by Mitsui Chemicals, Inc.) shown in Tables 1 and 2 was added to the above diluted mixture immediately before application, thereby preparing the aqueous coating agent (A) of Examples 1 to 15 and the aqueous coating agent (B) of Examples 1 to 15.

The aqueous coating agent (A) of Examples 1 to 15 and the aqueous coating agent (B) of Examples 1 to 15 were applied on a corona-treated surface of biaxially stretched polyethylene terephthalate (PET) film (trade name: P-60, 12 µm thickness, manufactured by Toray Industries, Inc.) or biaxially stretched polypropylene film (OPP, trade name: U-1, 20 µm thickness, manufactured by Mitsui Chemicals Tohcello Inc.), which was a resin film base material, by using a gravure printing machine so as to form the layer made of the aqueous coating agent (A) of Examples 1 to 15 and the layer made of the aqueous coating agent (B) of Examples 1 to 15, thereby obtaining the gas barrier films of Examples 1 to 15.

For Examples 1 to 6 and 8 to 13, two of the units of the gravure printing machine were used. For Examples 7, 14 and 15, three of the units of the gravure printing machine were used. For Examples 1 to 15, the aqueous coating agent (A) and the aqueous coating agent (B) were applied on the resin film base material at the thicknesses shown in Tables 1 and 2.

The thickness of the layer made of the aqueous coating agent (A) and the layer made of the aqueous coating agent (B) were confirmed by an electron microscope.

Comparative Examples 1 to 8

As the aqueous polyurethane resin (C) (hereinafter, also referred to as "component (C)"), polyurethane dispersion "Takelac WPB-341," manufactured by Mitsui Chemicals, Inc., which was an aqueous polyurethane resin containing a polyurethane resin having an acid group and a polyamine compound, and Hydran "HW350," manufactured by DIC Inc., which was a polyester polyurethane resin, were used.

As the water soluble polymer (D) (hereinafter, also referred to as "component (D)"), Poval PVA-105 (with a degree of saponification of 98-99% and a degree of polymerization of 500), manufactured by Kuraray Co., Ltd., and Poval PVA-124 (with a degree of saponification of 98-99% and a degree of polymerization of 2400) were used.

As the inorganic layered mineral (E) (hereinafter, also referred to as "component (E)"), water-swellable synthetic mica (trade name: Somasif MEB-3, manufactured by Co-op chemical Co., Ltd.) or purified montmorillonite (trade name: Kunipia-F, manufactured by Kunimine Industries Co., Ltd.) was used.

The component (C), the component (D) and the component (E) were formulated at the solid content compounding ratio shown in Table 3, heated to 80° C., mixed, and then cooled to a room temperature. Further, a mixture of the component (C), the component (D) and the component (E) were diluted with ion exchanged water and isopropanol so that 10 mass % of the solvent was made of isopropanol and the solid concentrations shown in Table 3 were obtained. In addition, the hardener (trade name: Takenate WD-725 (water dispersible polyisocyanate), manufactured by Mitsui Chemicals, Inc.) or the hardener (trade name: MW-12LF (N-methylolated melamine), manufactured by Sanwa Chemical Co., Ltd.) were added to the above diluted mixture immediately before application, thereby preparing the aqueous coating agents shown in Comparative examples 1 to 8.

The aqueous coating agents of Comparative examples 1 to 8 were applied on a corona-treated surface of biaxially stretched polyethylene terephthalate (PET) film (trade name: P-60, 12 µm thickness, manufactured by Toray Industries, Inc.) or biaxially stretched polypropylene film (OPP, trade name: U-1, 20 µm thickness, manufactured by Mitsui Chemicals Tohcello Inc.), which was a resin film base material, by using a gravure printing machine so as to form the layers made of the aqueous coating agents of Comparative examples 1 to 8, thereby obtaining the gas barrier films of Comparative examples 1 to 8.

For Comparative Examples 1 to 4, one of the units of the gravure printing machine was used. For Comparative Examples 5 to 7, two of the units of the gravure printing machine were used. For Comparative Example 8, three of the units of the gravure printing machine were used. For Comparative Examples 1 to 8, the aqueous coating agents were applied on the resin film base material at the thickness shown in Table 3.

The thickness of the layers made of the aqueous coating agents were confirmed by an electron microscope.

[Evaluation]

(1) Oxygen Gas Barrier Properties (Oxygen Transmittance Rate)

For the gas barrier films of Examples 1 to 15 and Comparative examples 1 to 8, oxygen gas barrier properties was measured by using an oxygen transmission rate tester (trade name: OXTRAN-2/20, manufactured by Mocon Inc.) in an atmosphere of 20° C. and 80% RH.

The evaluation results were shown in Tables 1 to 3.

(2) Laminate Strength

A 30 μm thick non-stretched propylene film (trade name: CPP GLC, manufactured by Mitsui Chemicals Tohcello Inc.) was laminated on a coating surface (gas barrier layer forming surface) of each of the gas barrier films of Examples 1 to 15 and Comparative examples 1 to 8 by a dry lamination process via a polyester urethane adhesive (trade name: Takelac A-525, Takenate A-52, manufactured by Mitsui Chemicals Inc.), and cured at 40° C. for 48 hours to obtain laminate films.

The laminate films were cut into 15 mm wide rectangular pieces. Then, the gas barrier film was peeled at 90 degrees at a rate of 300 mm/min. by using a tensile tester Tensilon (registered trade mark; manufactured by A & D Co., Ltd.) for measurement of lamination strength.

The evaluation results were shown in Tables 1 to 3.

(3) Laminate Strength of the Lamination Film after Storage for Two Months at 40° C. and 75%

A 30 μm thick non-stretched propylene film (trade name: CPP GLC, manufactured by Mitsui Chemicals Tohcello Inc.) was laminated on a coating surface of each of the gas barrier films of Examples 1 to 15 and Comparative examples 1 to 8 by a dry lamination process via a polyester urethane adhesive (trade name: Takelac A-525, Takenate A-52, manufactured by Mitsui Chemicals Inc.), and cured at 40° C. for 48 hours to obtain laminate films.

The laminate film was further stored in a thermostatic chamber at 40° C. and 75% for two months.

The laminate films which were stored for two months under the above conditions were cut into 15 mm wide rectangular pieces. Then, the gas barrier film was peeled at 90 degrees at a rate of 300 mm/min. by using a tensile tester Tensilon for measurement of lamination strength.

The evaluation results were shown in Tables 1 to 3.

TABLE 1

| | Example 1 | | Example 2 | | Example 3 | | Example 4 | | Example 5 | |
|---|---|---|---|---|---|---|---|---|---|---|
| | First layer | Second layer | First layer | Second layer | First layer | Second layer | First layer | Second layer | First layer | Second layer |
| C Aqueous polyurethane resin | WPB-341 | WPB-341 | WPB-341 | WPB-341 | WPB-341 | WPB-341 | WPB-341 | WPB-341 | WPB-341 | WPB-341 |
| Compounding ratio (%) | 25 | 26 | 25 | 27 | 25 | 28 | 25 | 40 | 25 | 10 |
| D Water soluble polymer | PVA 105 | PVA 105 | PVA 105 | PVA 105 | PVA 105 | PVA 105 | PVA 105 | PVA 105 | PVA 105 | PVA 105 |
| Compounding ratio (%) | 50 | 53 | 50 | 54 | 50 | 56 | 50 | 50 | 50 | 70 |
| E Inorganic layered mineral | Somasif | Somasif | Somasif | Somasif | Somasif | Somasif | Somasif | Somasif | Somasif | Somasif |
| Compounding ratio (%) | 15 | 16 | 15 | 16 | 15 | 17 | 15 | 10 | 15 | 20 |
| F Hardener | WD-725 | WD-725 | WD-725 | WD-725 | WD-725 | WD-725 | WD-725 | WD-725 | WD-725 | WD-725 |
| Compounding ratio (%) | 10 | 5 | 10 | 2 | 10 | 0 | 10 | 0 | 10 | 0 |
| Solid content concentration (%) | 9 | 8.6 | 9 | 8.3 | 9 | 8.2 | 9 | 8.2 | 9 | 8.2 |
| Dried film thickness (μm) | 0.3 | 0.3 | 0.3 | 0.3 | 0.3 | 0.3 | 0.3 | 0.3 | 0.3 | 0.3 |
| Resin film base material | OPP | | OPP | | OPP | | OPP | | OPP | |
| Oxygen transmission rate (cm³/m² · day · atm) | 5 | | 4 | | 3 | | 5 | | 2 | |
| Laminate strength (N/15 mm) | 1.6 | | 1.5 | | 1.5 | | 1.9 | | 1.2 | |
| Laminate strength after storage for two months (N/15 mm) | 1.3 | | 1.3 | | 1.3 | | 1.4 | | 1.1 | |

| | Example 6 | | Example 7 | | | Example 8 | |
|---|---|---|---|---|---|---|---|
| | First layer | Second layer | First layer | Second layer | Third layer | First layer | Second layer |
| C Aqueous polyurethane resin | WPB-341 | WPB-341 | WPB-341 | WPB-341 | WPB-341 | WPB-341 | WPB-341 |
| Compounding ratio (%) | 55 | 45 | 25 | 26 | 28 | 25 | 0 |
| D Water soluble polymer | PVA 105 | PVA 105 | PVA 105 | PVA 105 | PVA 105 | PVA 105 | PVA 105 |

TABLE 1-continued

|  |  |  |  |  |  |  |  |
|---|---|---|---|---|---|---|---|
| Compounding ratio (%) | 30 | 40 | 50 | 53 | 56 | 50 | 80 |
| E Inorganic layered mineral | Somasif | Somasif | Somasif | Somasif | Somasif | Somasif | Somasif |
| Compounding ratio (%) | 15 | 15 | 15 | 16 | 17 | 15 | 20 |
| F Hardener | WD-725 | WD-725 | WD-725 | WD-725 | WD-725 | WD-725 | WD-725 |
| Compounding ratio (%) | 10 | 0 | 10 | 5 | 0 | 10 | 0 |
| Solid content concentration (%) | 9 | 8.2 | 9 | 8.6 | 8.2 | 9 | 8.2 |
| Dried film thickness (μm) | 0.3 | 0.3 | 0.2 | 0.2 | 0.2 | 0.3 | 0.3 |
| Resin film base material | PET | | | OPP | | OPP | |
| Oxygen transmission rate (cm³/m²·day·atm) | 2 | | | 3 | | 3 | |
| Laminate strength (N/15 mm) | 1.7 | | | 1.4 | | 1.7 | |
| Laminate strength after storage for two months (N/15 mm) | 1.2 | | | 1.2 | | 1.1 | |

TABLE 2

| | Example | | | | | | | |
|---|---|---|---|---|---|---|---|---|
| | 9 | | 10 | | 11 | | 12 | |
| | First layer | Second layer | First layer | Second layer | First layer | Second layer | First layer | Second layer |
| C Aqueous polyurethane resin | WPB-341 | WPB-341 | WPB-341 | WPB-341 | WPB-341 | WPB-341 | WPB-341 | WPB-341 |
| Compounding ratio (%) | 25 | 0 | 25 | 25 | 25 | 25 | 30 | 25 |
| D Water soluble polymer | PVA 105 | PVA 105 | CMC | PVA 105 | PVA 105 | CMC | PVA 105 | PVA 105 |
| Compounding ratio (%) | 50 | 85 | 50 | 60 | 50 | 60 | 50 | 60 |
| E Inorganic layered mineral | Somasif | Somasif | Somasif | Somasif | Somasif | Somasif | NHT | Somasif |
| Compounding ratio (%) | 15 | 15 | 15 | 15 | 15 | 15 | 10 | 15 |
| F Hardener | WD-725 | WD-725 | WD-725 | WD-725 | WD-725 | WD-725 | WD-725 | WD-725 |
| Compounding ratio (%) | 10 | 0 | 10 | 0 | 10 | 0 | 10 | 0 |
| Solid content concentration (%) | 9 | 8.2 | 9 | 8.2 | 9 | 8.2 | 9 | 8.2 |
| Dried film thickness (μm) | 0.3 | 0.3 | 0.3 | 0.3 | 0.3 | 0.3 | 0.3 | 0.3 |
| Resin film base material | OPP | | OPP | | OPP | | PET | |
| Oxygen transmission rate (cm³/m²·day·atm) | 5 | | 3 | | 3 | | 2 | |
| Laminate strength (N/15 mm) | 1.9 | | 1.7 | | 1.7 | | 1.3 | |
| Laminate strength after storage for two months (N/15 mm) | 1.2 | | 1.2 | | 1.2 | | 1 | |

| | Example | | | | | | | |
|---|---|---|---|---|---|---|---|---|
| | 13 | | 14 | | | 15 | | |
| | First layer | Second layer | First layer | Second layer | Third layer | First layer | Second layer | Third layer |
| C Aqueous polyurethane resin | WPB-341 | WPB-341 | HW 350 | HW 350 | HW 350 | HW 350 | HW 350 | HW 350 |
| Compounding ratio (%) | 25 | 30 | 25 | 25 | 25 | 25 | 0 | 0 |
| D Water soluble polymer | PVA 105 | PVA 105 | PVA 105 | PVA 105 | PVA 105 | PVA 105 | PVA 105 | PVA 105 |
| Compounding ratio (%) | 50 | 60 | 50 | 60 | 60 | 50 | 80 | 80 |
| E Inorganic layered mineral | Somasif | NHT | Somasif | Somasif | Somasif | Somasif | Somasif | Somasif |

TABLE 2-continued

| Compounding ratio (%) | 15 | 10 | 15 | 15 | 15 | 15 | 20 | 20 |
|---|---|---|---|---|---|---|---|---|
| F Hardener | WD-725 | WD-725 | WD-725 | WD-725 | WD-725 | WD-725 | WD-725 | WD-725 |
| Compounding ratio (%) | 10 | 0 | 10 | 0 | 0 | 10 | 0 | 0 |
| Solid content concentration (%) | 9 | 8.2 | 6 | 6 | 6 | 6 | 6 | 6 |
| Dried film thickness (μm) | 0.3 | 0.3 | 0.2 | 0.2 | 0.2 | 0.2 | 0.2 | 0.2 |
| Resin film base material | PET | | | OPP | | | OPP | |
| Oxygen transmission rate (cm$^3$/m$^2$ · day · atm) | 2 | | | 8 | | | 4 | |
| Laminate strength (N/15 mm) | 1.3 | | | 1.7 | | | 1.9 | |
| Laminate strength after storage for two months (N/15 mm) | 1.1 | | | 1.4 | | | 1.3 | |

TABLE 3

| | Comparative example | | | | | | | | | | | | |
|---|---|---|---|---|---|---|---|---|---|---|---|---|---|
| | 1 | 2 | 3 | 4 | 5 | | 6 | | 7 | | 8 | | |
| | First layer | First layer | First layer | First layer | First layer | Second layer | First layer | Second layer | First layer | Second layer | First layer | Second layer | Third layer |
| C Aqueous polyurethane resin | WPB-341 | WPB-341 | WPB-341 | HW 350 | WPB-341 | WPB-341 | WPB-341 | WPB-341 | WPB-341 | WPB-341 | HW 350 | HW 350 | HW 350 |
| Compounding ratio (%) | 25 | 28 | 28 | 17 | 25 | 25 | 25 | 22 | 28 | 25 | 25 | 25 | 25 |
| D Water soluble polymer | PVA 105 | PVA 105 | PVA 105 | PVA 124 | PVA 105 | PVA 105 | PVA 105 | PVA 105 | PVA 105 | PVA 105 | PVA 105 | PVA 105 | PVA 105 |
| Compounding ratio (%) | 50 | 56 | 56 | 40 | 50 | 50 | 50 | 44 | 56 | 50 | 50 | 50 | 50 |
| E Inorganic layered mineral | Somasif | Somasif | Somasif | Kunipia F | Somasif | Somasif | Somasif | Somasif | Somasif | Somasif | Somasif | Somasif | Somasif |
| Compounding ratio (%) | 15 | 17 | 17 | 40 | 15 | 15 | 15 | 13 | 17 | 15 | 15 | 15 | 15 |
| F Hardener | WD-725 | WD-725 | WD-725 | MW-12 LF | WD-725 | WD-725 | WD-725 | WD-725 | WD-725 | WD-725 | WD-725 | WD-725 | WD-725 |
| Compounding ratio (%) | 10 | 0 | 0 | 3 | 10 | 10 | 10 | 20 | 0 | 10 | 10 | 10 | 10 |
| Solid content concentration (%) | 9 | 8.2 | 8.2 | 2.5 | 9 | 9 | 9 | 9.8 | 8.2 | 9 | 6 | 6 | 6 |
| Dried film thickness (μm) | 0.6 | 0.6 | 0.6 | 0.8 | 0.3 | 0.3 | 0.3 | 0.3 | 0.3 | 0.3 | 0.2 | 0.2 | 0.2 |
| Resin film base material | OPP | OPP | PET | PET | OPP | | OPP | | OPP | | OPP | | |
| Oxygen transmission rate (cm$^3$/m$^2$ · day · atm) | 12 | 7 | 5 | 2 | 8 | | 12 | | 3 | | 15 | | |
| Laminate strength (N/15 mm) | 1.7 | 0.1 | 0.1 | 0.6 | 1.7 | | 1.7 | | 0.1 | | 1.5 | | |
| Laminate strength after storage for two months (N/15 mm) | 1.2 | 0.1 | 0.1 | 0.5 | 1.2 | | 1.3 | | 0.1 | | 1.3 | | |

From the results shown in Tables 1 to 3, the gas barrier film of Examples 1 to 15 maintained both the oxygen gas barrier properties in an atmosphere of 20° C. and 80% RH and the laminate strength after lapse of two months at levels higher than those of Comparative examples 1 to 8, since the aqueous coating agent (A) having oxygen gas barrier properties and adhesiveness to the resin film base material was applied, and at least one aqueous coating agent (B) having a compounding ratio of a hardener smaller than that of the aqueous coating agent (A) or the aqueous coating agent (B) which does not contain a hardener was applied on the aqueous coating agent (A).

Further, good oxygen gas barrier properties and the laminate strength after lapse of two months were obtained in Examples 8 to 13, in which the aqueous coating agent (A) as a first layer and the aqueous coating agent (B) as a second layer have different components.

Further, in Examples 14 and 15, the aqueous coating agent (A) having oxygen gas barrier properties and adhesiveness to the resin film base material was applied as the first layer, and two layers of the aqueous coating agent (B) having a compounding ratio of a hardener smaller than that of the aqueous coating agent (A) or the aqueous coating agent (B) which does not contain a hardener were applied on the aqueous coating agent (A). Accordingly, comparing with Comparative example 8 in which three layers having the same composition were applied, improved oxygen gas barrier properties and laminate strength can be obtained without additional process which involves additional cost.

In addition, for barrier packaging materials used for food products or pharmaceutical products, it is preferred that oxygen gas barrier properties in an atmosphere of 20° C. and 80% RH is not greater than 10 $cm^3/m^2/day/atm$, and the laminate strength after storage for two months at 40° C. and 75% is not less than 1 N/15 mm.

INDUSTRIAL APPLICABILITY

The gas barrier film of the present invention has good gas barrier properties in a high-humidity atmosphere and high adhesiveness to the resin film base material and film cohesiveness for an extended period of time. Accordingly, the gas barrier film of the present invention can be used as a packaging material to enhance the preservation of product quality and applied to a variety of packaging applications. Further, the gas barrier film of the present embodiment can be manufactured with reduced cost by performing continuous application of the aqueous coating agent by using a tandem coater or a gravure printing machine.

REFERENCE SIGNS LIST

1 Resin film base material
2 Layer made of aqueous coating agent (A)
3 Layer made of aqueous coating agent (B)
4 Gas barrier film

What is claimed is:
1. A gas barrier film comprising:
a resin film base material;
a layer made of an aqueous coating agent (A) which contains a hardener and has gas barrier properties and adhesiveness to the resin film base material, the layer made of the aqueous coating agent (A) being formed on at least one surface of the resin film base material; and
at least one layer made of an aqueous coating agent (B) having a compounding ratio of a hardener smaller than that of the aqueous coating agent (A), the layer made of the aqueous coating agent (B) being formed on the layer made of the aqueous coating agent (A)
wherein the aqueous coating agent (A) contains an aqueous polyurethane resin (C) that is at least water soluble or water dispersible, a water soluble polymer (D) and an inorganic layered mineral (E), and wherein the aqueous coating agent (B) contains the water soluble polymer (D) and the inorganic layered mineral (E).
2. The gas barrier film according to claim 1, wherein the aqueous coating agent (A) and the aqueous coating agent (B) contain the aqueous polyurethane resin (C) that is at least water soluble or water dispersible, the water soluble polymer (D) and the inorganic layered mineral (E).
3. The gas barrier film according to claim 1, wherein the aqueous polyurethane resin (C) is an aqueous polyurethane resin which contains a polyurethane resin having an acid group and a polyamine compound.
4. The gas barrier film according to claim 1, wherein the water soluble polymer (D) is a polyvinyl alcohol resin.
5. The gas barrier film according to claim 1, wherein the inorganic layered mineral (E) is a water-swellable synthetic mica.
6. A gas barrier film comprising:
a resin film base material;
a layer made of an aqueous coating agent (A) which contains a hardener and has gas barrier properties and adhesiveness to the resin film base material, the layer made of the aqueous coating agent (A) being formed on at least one surface of the resin film base material; and
at least one layer made of an aqueous coating agent (B) that does not contain a hardener, the layer made of the aqueous coating agent (B) being formed on the layer made of the aqueous coating agent (A)
wherein the aqueous coating agent (A) contains an aqueous polyurethane resin (C) that is at least water soluble or water dispersible, a water soluble polymer (D) and an inorganic layered mineral (E), and wherein the aqueous coating agent (B) contains the water soluble polymer (D) and the inorganic layered mineral (E).
7. The gas barrier film according to claim 6, wherein the aqueous coating agent (A) and the aqueous coating agent (B) contain the aqueous polyurethane resin (C) that is at least water soluble or water dispersible, the water soluble polymer (D) and the inorganic layered mineral (E).
8. The gas barrier film according to claim 6, wherein the aqueous polyurethane resin (C) is an aqueous polyurethane resin which contains a polyurethane resin having an acid group and a polyamine compound.
9. The gas barrier film according to claim 6, wherein the water soluble polymer (D) is a polyvinyl alcohol resin.
10. The gas barrier film according to claim 6, wherein the inorganic layered mineral (E) is a water-swellable synthetic mica.

* * * * *